Dec. 13, 1927.
D. MARTIN
1,652,248
RADIUS ROD CONNECTION
Filed May 13, 1925
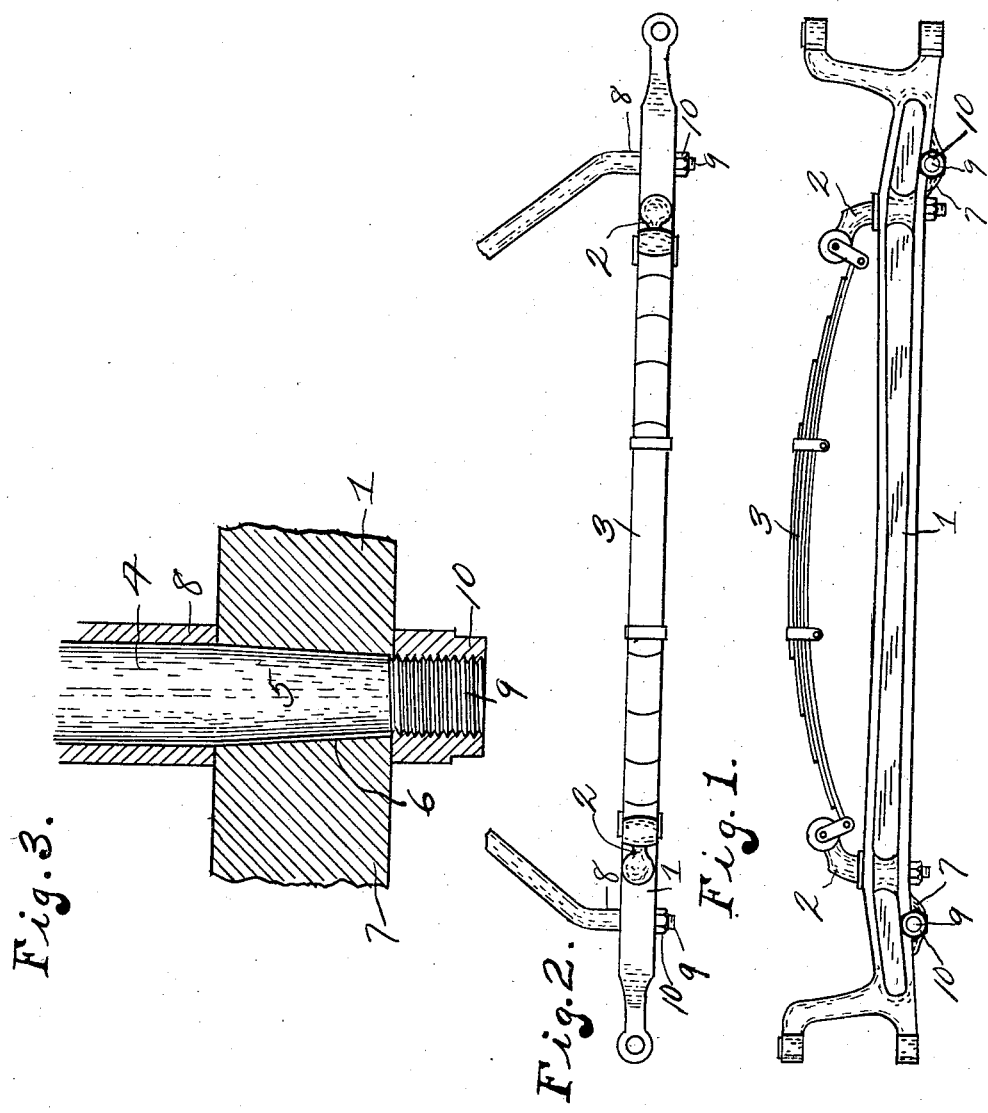
INVENTOR.
D. Martin
BY
Philip A. H. Ferell
ATTORNEY.

Patented Dec. 13, 1927.

1,652,248

UNITED STATES PATENT OFFICE.

DELBERT MARTIN, OF NORTH PLATTE, NEBRASKA, ASSIGNOR OF ONE-HALF TO D. E. MARTIN, OF NORTH PLATTE, NEBRASKA.

RADIUS-ROD CONNECTION.

Application filed May 13, 1925. Serial No. 29,988.

The invention relates to radius rod connections with the front axle of automobiles and has for its object a more rigid and substantial means of connecting those two elements, the radius rod and the axle than the present means of forming this connection. It has been found that the present means of connecting the radius rod to the front axle is not satisfactory on account of it being on the plan of a clamp connection which form of connection soon becomes loose on account of the wear of the parts, thus causing lost motion which is entirely obviated by providing a tapering aperture transversely through the axle into which a tapered end of the radius rod is inserted, which rigidly holds the rod in fixed position where it cannot possibly become loose or cause lost motion in its operation.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a front view of the conventional form of automobile axle, showing the radius rod connection.

Figure 2 is a top plan view of the axle showing the radius rods connected thereto.

Figure 3 is a horizontal sectional view through a portion of an axle showing the tapering radius rod connection.

Referring to the drawing the numeral 1 designates the front axle of a conventional form of automobile, which axle is provided with spring perches 2, to which the ends of a conventional form of spring are secured. Radius rods as at present constructed are connected to the axle 1 by a clamping arrangement which quickly works loose, consequently rattling and lost play develops as well as the backward movement of the axle, and consequent bending of the radius rod. To obviate the above difficulty, the radius rods 4 are provided with tapered ends 5 which extend through and tightly fit tapered apertures 6 in the downwardly extending integral members 7 carried by the underside of the axle 1. The radius rods 4 are provided with sleeves 8 which engage the rear sides of the extension 7 and preferably covers the entire surfaces of the rods. The outer ends of the rods are provided with threaded portions 9 on which nuts 10 are threaded, and it will be seen when the nuts are tightened the tapered portions of the radius rods will be forced into close binding engagement with the tapered apertures 6, thereby rigidly connecting the radius rods to the axles in a manner whereby lost play will not develop, and if it does develop it may be easily and quickly taken up by tightening the nuts 10.

From the above it will be seen that a radius rod connection is provided with the front axle of an automobile, which connection is extremely simple in construction, and although involving a simple structure has been found extremely valuable in obviating a common difficulty now experienced in radius rod connections as at present constructed.

The invention having been set forth what is claimed as new and useful is:—

The combination with a radius rod, a sleeve on said rod, an axle of a connection between said radius rod and axle, said connection comprising a downwardly extending integral member carried by the underside of the axle and having a tapered aperture therein, a tapered end carried by said radius rod and disposed in said aperture said sleeve engaging one side of the integral member and a nut threaded on said tapered end of the radius rod and cooperating with one side of the integral member for securely jamming the tapered end of the radius rod in the aperture and the sleeve against the other side of the integral member.

In testimony whereof I affix my signature.

DELBERT MARTIN.